(12) United States Patent
Harris et al.

(10) Patent No.: US 7,736,606 B2
(45) Date of Patent: Jun. 15, 2010

(54) PROCESS FOR THE RECOVERY OF VALUE METALS FROM BASE METAL SULFIDE ORES

(75) Inventors: G. Bryn Harris, Montreal (CA); Vaikuntam I. Lakshmanan, Mississauga (CA); Ramamritham Sridhar, Mississauga (CA); George Puvvada, Markham (CA)

(73) Assignee: Jaguar Nickel Inc., Toronto, Ontario (CA)

( * ) Notice: Subject to any disclaimer, the term of this patent is extended or adjusted under 35 U.S.C. 154(b) by 1133 days.

(21) Appl. No.: 10/950,671

(22) Filed: Sep. 28, 2004

(65) Prior Publication Data
US 2005/0118081 A1  Jun. 2, 2005

Related U.S. Application Data

(60) Provisional application No. 60/506,773, filed on Sep. 30, 2003, provisional application No. 60/558,571, filed on Apr. 2, 2004.

(51) Int. Cl.
*C22B 11/06* (2006.01)
*C22B 3/10* (2006.01)
*C22B 3/12* (2006.01)

(52) U.S. Cl. .............. 423/22; 423/38; 423/39; 423/109; 423/150.1; 423/150.5

(58) Field of Classification Search .............. 423/22, 423/25, 27, 38, 150.1, 150.5, 109
See application file for complete search history.

(56) References Cited

U.S. PATENT DOCUMENTS

| | | |
|---|---|---|
| 704,639 A | 7/1902 | Hoepfner |
| 735,098 A | 8/1903 | Hoepfner |
| 752,320 A | 2/1904 | de Alzugaray |
| 1,539,714 A | 5/1925 | Christensen |
| 2,424,351 A | 7/1947 | Christensen |
| 3,764,490 A | 10/1973 | Chambers |
| 3,791,812 A | 2/1974 | Frank et al. |
| 3,909,249 A | 9/1975 | Coldrey et al. |
| 3,922,164 A | 11/1975 | Reid et al. |
| 3,923,616 A | 12/1975 | Ataden et al. |
| 3,998,628 A | 12/1976 | Gandon et al. |
| 4,039,406 A | 8/1977 | Stanley et al. |
| 4,062,924 A | 12/1977 | Glaum |
| 4,097,271 A | 6/1978 | Swinkels et al. |
| 4,288,304 A | 9/1981 | DeMarthe et al. |
| 4,378,275 A | 3/1983 | Adamson et al. |
| 4,435,368 A | 3/1984 | Demarthe et al. |
| 4,536,214 A | 8/1985 | Ochs et al. |
| 4,594,132 A | 6/1986 | Satchell, Jr. et al. |
| 4,614,543 A | 9/1986 | Duyvesteyn et al. |
| 4,944,928 A | 7/1990 | Grill |
| 5,232,490 A | 8/1993 | Bender et al. |
| 5,431,788 A | 7/1995 | Jones |
| 5,709,730 A | 1/1998 | Cashman |
| RE37,251 E | 7/2001 | Jones |
| 6,315,812 B1 | 11/2001 | Fleming et al. |
| 6,395,242 B1 | 5/2002 | Allen et al. |
| 6,428,599 B1 | 8/2002 | Cashman |
| 6,471,743 B1 | 10/2002 | Young et al. |
| 2002/0152845 A1 | 10/2002 | Fleming et al. |
| 2002/0159927 A1 | 10/2002 | Allen et al. |

FOREIGN PATENT DOCUMENTS

| | | |
|---|---|---|
| CA | 844536 A | 6/1970 |
| CA | 1143573 | 3/1983 |
| CA | 2385775 | 4/2001 |
| EP | 155250 | 2/1989 |
| EP | A-1281779 | 2/2003 |
| GB | 227301 | 1/1925 |

(Continued)

OTHER PUBLICATIONS

Everett, P.K., "The Single Step Conversion of Chalcopyrite to Copper, Iron Oxide and Elemental Sulphur", Paper presented at Extractive Metallurgy Symposium, University of NSW, (Nov. 8, 1977).

(Continued)

*Primary Examiner*—Stanley Silverman
*Assistant Examiner*—James Fiorito
(74) *Attorney, Agent, or Firm*—Michael I. Stewart; Sim & McBurney

(57) ABSTRACT

A process for leaching a value metal from a base metal sulfide ore, comprising the step of leaching the ore with a lixiviant comprising a chloride, an oxidant and hydrochloric acid is disclosed. The leaching is controlled, by use of low concentrations of hydrochloric acid and a redox potential, to effect formation of hydrogen sulfide from the base metal sulfide ore. The hydrogen sulfide is stripped from the leach solution, thereby reducing the amount of sulfate generated in the leach to very low levels. The leaching may also be conducted to limit the co-dissolution of platinum group metals and gold with the base value metals. The leach forms a value metal-rich leachate and a solids residue. The solids residue may be subsequently leached to recover the platinum group metals and gold. The value metal-rich leachate can be is oxidized and neutralized to recover the value base metals. In an embodiment, the chloride is magnesium chloride and lixiviant solution is regenerated.

22 Claims, 2 Drawing Sheets

FOREIGN PATENT DOCUMENTS

| | | |
|---|---|---|
| GB | 239720 | 9/1925 |
| GB | 1008196 | 10/1965 |
| GB | 1510676 | 5/1978 |
| WO | WO 01/23627 | 2/2000 |
| ZA | A-9200939 | 8/1993 |

OTHER PUBLICATIONS

Rene Winand, *Chloride hydrometallurgy* Hydrometallurgy 27, (1991), pp. 285-316.

PROCESS FOR THE RECOVERY OF VALUE METALS FROM BASE METAL SULFIDE ORES

FIELD OF THE INVENTION

The present invention relates to a method for the leaching and recovery of value metals, especially nickel, copper, zinc and cobalt values, and Platinum Group Metals (PGMs) and gold from base metal sulfide ores, including from mixtures of sulfide and oxide ores. In particular embodiments, the base metal sulfide ores are value metal-containing ores or concentrates, especially pyrrhotite, pentlandite, chalcopyrite, arsenopyrite and other pyrites, sphalerite, and concentrates and mattes thereof. The leaching may be conducted using a low concentration of hydrochloric acid, in chloride media. In particular, the method may be operated such that sulfide in the ore is substantially converted to hydrogen sulfide, and preferably essentially converted to hydrogen sulfide, rather than to sulfate or to elemental sulfur. In preferred embodiments, the hydrogen sulfide formed is stripped from the leach solution, thereby providing leachate with a low concentration of sulfur and/or sulfate. Conversion of the sulfide of the ore to, in particular, hydrogen sulfide simplifies and/or allows for alternate steps for separation and recovery of value metals.

BACKGROUND OF THE INVENTION

Base metal sulfide ores exist in many areas of the world and are a potential source of many value metals. In particular, the ores may contain zinc, nickel, copper, cobalt and the PGMs, silver and gold. The principal ores are all iron-bearing, and examples particularly include nickeliferous pyrrhotite $Fe_8S_9$, pentlandite $(FeNi)_9S_8$, chalcopyrite $CuFeS_2$, arsenopyrite FeAsS and sphalerite ZnS. Cobalt may be found in the lattice of a pentlandite ore. Base metal sulfide ores have been used extensively in the commercial production of nickel, cobalt, zinc and copper.

Base metal sulfide ores may be processed using hydrometallurgical or pyrometallurgical techniques. Recovery of nickel, copper and PGMs tends to be high with the pyrometallurgical route, typically being greater than 90%, and cobalt recovery is typically between 30 and 70%. Recovery of nickel, cobalt, zinc and copper is also high in the hydrometallurgical route, but PGMs and gold tend to be lost in the leach residue unless further, often complicated and costly, recovery processes are carried out.

Smelting of nickel sulfide concentrates produces a liquid furnace matte. The liquid furnace matte is then subjected to air oxidation, in a process known as converting, to remove most of the iron and sulfur. Iron and gangue impurities are removed as a disposable slag. The resulting converter matte, also known simply as matte, may then be treated to obtain the nickel, cobalt, copper and PGMs and gold. The treatment methods used are mainly hydrometallurgical, for example refining processes based on sulfate, carbonyl, ammoniacal and chloride chemistry. Sulfate and especially chloride-based refining processes are discussed by G. Van Weert in "Some Observations on the Chloride Based Treatment of Nickel-Copper-Cobalt Mattes" pages 277-298 of Chloride Metallurgy 2002—Volume 1, 32$^{nd}$ Annual Hydrometallurgy Meeting, Edited by E. Peek and G. Van Weert, published by CIM.

In a chloride leach process, the most valuable component, viz. nickel, may be solubilized first, with little leaching of copper, thus achieving a separation of nickel from copper. In a known chloride leach process (Thornhill, P. G., Wigstol, E and Van Weert, G., "The Falconbridge Matte Leach Process", Journal of Metals, 23(7), 1971 p13) using very strong hydrochloric acid, the leach may be represented as follows:

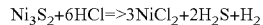

In an alternative leach process based on chlorine, a granulated converter matte is ground and fed to a chlorine leach process where it is subjected in a first step to a redox controlled leach process solubilizing most of the nickel and part of the copper, but none of the PGMs:

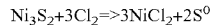

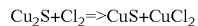

To remove cupric copper, which is the regarded as the leachant, additional matte is added without chlorine, followed by cementation. In another alternative, advantages of a chlorine leach could be achieved using sub-azeotropic hydrochloric acid and oxygen. Solubilized copper (cupric) chloride would again be the leaching agent.

The hydrometallurgy of complex sulfide bulk concentrates is discussed by D. S. Flett in "Chloride Hydrometallurgy for Complex Sulfides: a Review" pages 255-276 of Chloride Metallurgy 2002—Volume 1 above. In particular, the ferric or cupric chloride leaching of Cu/Pb/Zn/Ag type sulfide concentrates is discussed. Recent activity in the treatment of single sulfide concentrates, particularly copper e.g. pressure leaching using $BrCl_2^-$ as oxidant, is also reported. The article concludes that this is the most promising process for commercialization but the development of processing of complex sulfide concentrates still has some way to go before commercialization is finally realized.

A process for recovering non-ferrous metal values from a metal-containing sulfide material containing at least one of zinc, copper, lead, cobalt, nickel, silver and gold, as well as iron, is disclosed in U.S. Pat. No. 4,378,275 of Adamson et al, issued Mar. 29, 1983. The sulfide material is leached under oxidizing conditions with acidic aqueous chloride lixiviant solution containing magnesium chloride. The oxidizing conditions are disclosed as use of molecular oxygen in the form of air, oxygen-enriched air and pure oxygen. Although leaching at atmospheric pressure is stated to be possible, it is preferable to operate the leach stage under elevated partial pressures, i.e. under pressure leach conditions. Use of elevated temperatures is preferred, i.e. at least about 50° C. to about 250° C., with temperatures in the range of 100° C. to 180° C. being preferred. The period for leaching is from about 5 minutes to about 12 hours. The use of low chloride levels is preferred. For example, Adamson et al. provides that the chloride ion concentration is typically from about 4 to about 6 grams of ions per liter. The kinetics of the process would indicate a need to use long periods of leaching at the lower temperatures and atmospheric pressure. Pressure leaching, using oxygen, of a Zn/Cu/Fe ore containing very low levels of nickel at 160° C. is exemplified. In the process, non-ferrous metal values are solubilized, leaving iron oxide and sulfur as a residue. The leach liquor is subjected to liquid—liquid extraction using a hydrophobic extractant. The raffinate, containing magnesium chloride and any sulfates formed during the leach process, is subjected to pyrohydrolysis to yield hydrogen chloride and magnesium oxide. The sulfates are then removed by washing of the magnesium oxide formed, which counteracts many of the advantages of forming magnesium oxide by pyrohydrolysis.

SUMMARY OF THE INVENTION

In one aspect, this invention provides a method for the separation of sulfur, which is derived from sulfides associated with base metals, from a lixiviant produced during the leaching of base metals from a base metal sulfide ore or concentrate, especially nickel, copper, zinc, cobalt and PGMs, silver and gold, that operates at atmospheric pressure. In accordance with this aspect, the process relates to a method for the reduction of the amount of sulfur in the leachate and leach solids by separation of sulfide in the ore as hydrogen sulfide during the leaching of a base value metal from a base metal sulfide ore. In particular, sulfur may be removed from the leachate and the solid leach residue by forming and stripping hydrogen sulfide in the leaching step. Some or all of the hydrogen sulfide may subsequently be converted to elemental sulfide. An advantage of this process is that sulfur in the form of hydrogen sulfide may be separated by simple gas/liquid separation techniques. The hydrogen sulfide may be used for downstream purification treatments of the leachate and/or as a relatively pure source of hydrogen sulfide for use in the production of sulfur compounds, such as elemental sulfur.

In another aspect, this invention provides a process for the recovery of value metals from base metal sulfide ore, concentrate or matte by leaching with a lixiviant having a high chloride concentration and a low concentration of hydrochloric acid. The use of a lixiviant with a high chloride loading permits the use of lower concentrations of hydrochloric acid in the lixiviant.

In has now been determined that by adjusting the redox potential and the pH of a lixiviant, base metals associated with a sulfide may be leached from a sulfide source material using a lixiviant having a high chloride content and a relatively low concentration of hydrochloric acid while PGMs and gold are essentially not leached and wherein a substantial portion, and preferably essentially all, of the sulfide that is leached is converted to hydrogen sulfide. It will be appreciated that, in some embodiments, it may be determined to leach some of the PGMs and gold with the base metals. In other embodiments, it may be determined to conduct the leach of the base metals so that a portion of the sulfide sulfur that is dissolved is not converted to hydrogen sulfide. The extent to which some of the PGMs and gold may be leached with the base metals and the sulfide sulfur that is dissolved and converted to hydrogen sulfide will vary depending upon several factors including the composition of the sulfide source material, the degree of metal recovery that is selected and the reaction kinetics that are selected for the leaching step.

In accordance with one aspect of the present invention, there is provided a process for leaching a value metal from a sulfide ore material containing said value metal, said sulfide ore material, comprising the step of leaching the sulfide ore material at atmospheric pressure with a lixiviant comprising hydrochloric, a chloride selected from the group consisting of alkali metal chlorides, magnesium chloride and calcium chloride, and mixtures thereof, and an oxidant selected from the group consisting of alkali metal peroxide, alkali metal perchlorate, ammonium perchlorate, magnesium perchlorate, alkali metal chlorate, alkaline earth metal perchlorate, chlorine, alkali metal hypochlorite, hydrogen peroxide and peroxysulfuric acid, and mixtures thereof to obtain a leachate and a solid residue.

In one embodiment, the process further comprises selecting a sulfide ore material that contains at least one value metal selected from the group consisting of nickel, copper, zinc and cobalt, and mixtures thereof.

In another embodiment, the process further comprises selecting a sulfide ore material that additionally contains at least one of gold and a platinum group metal.

In another embodiment, the process further comprises selecting a sulfide ore material that comprises a base metal sulfide ore, a concentrate of a base metal sulfide ore, a matte obtained from a base metal sulfide ore, tailings from the processing of a base metal sulfide ore and mixtures thereof.

In another embodiment, the process further comprises selecting pyrrhotite, pentlandite, chalcopyrite, pyrite, arsenopyrite and sphalerite, and mixtures thereof as the base metal sulfide.

In another embodiment, the process further comprises selecting sodium chloride, potassium chloride, magnesium chloride and calcium chloride, and mixtures as the chloride.

In another embodiment, the process further comprises selecting magnesium chloride as the chloride.

In another embodiment, the process further comprises selecting chlorine, sodium chlorate, hydrogen peroxide, sodium hypochlorite and sodium perchlorate and mixtures thereof as the oxidant.

In another embodiment, the process further comprises selecting sodium chlorate, chlorine and mixtures thereof as the oxidant.

In another embodiment, the process further comprises adjusting the pH and the redox potential during the leach so that the pH is less than 2.5 and the redox potential is in the range of 200 to 600 mV.

In another embodiment, the process further comprises adjusting the redox potential during the leach so that the redox potential of the leach solution is in the range 250-450 mV.

In another embodiment, the process further comprises selecting the concentration of magnesium chloride to be at least 200 g/L, preferably to be in the range of 200-500 g/L and more preferably to be in the range of 200-400 g/L, the total concentration being formed essentially from magnesium chloride and hydrochloric acid. Optionally, the amount of hydrochloric acid is in the range of 30-150 g/L.

In another embodiment, the process further comprises conducting the leach at a temperature in the range of from 75° C. to the boiling point of the solution at ambient pressure.

In another embodiment, the process further comprises adjusting the pH so that, at the end of the leach, the pH is less than 1.5 and, preferably less than 1.

In another embodiment, the leachate and a solid residue are subjected to a solids/liquid separation step and the solid residue is subjected to a further leaching step to recover at least a portion of the gold and at least one of the platinum group metal.

In another embodiment, the solid residue is also treated for separation of a magnetic fraction.

In another embodiment, the process further comprises selecting the ore or concentrate to comprise values of nickel and iron, and one or more of cobalt and copper.

In another embodiment, the process further comprises:
(a) subjecting the leachate to a series of value metal recovery steps and obtaining a value metal depleted leachate and
(b) treating the value metal depleted leachate to recycle at least a portion of the hydrochloric acid and chloride.

Step (b) preferably comprises pyrohydrolysis. Preferably, step (a) includes at least one precipitation step using a base. Preferably the base is magnesium oxide. Preferably, magnesium oxide is produced from the value metal depleted leachate.

In another embodiment, the process further comprises treating the leachate to precipitate iron.

In another embodiment, the leachate is treated by increasing the pH of the leachate, subsequent to removal of the residual solids to, to precipitate iron.

In accordance with another aspect of the present invention, there is provided a process for leaching a value metal from a sulfide source material containing said value metal with a lixiviant comprising hydrochloric, a metal chloride, and an oxidant, the leaching with said lixiviant being controlled so that at least about 50% of sulfide sulfur that is leached from the sulfide source material is converted to hydrogen sulfide during said leaching to obtain a leachate and a solid residue.

In one embodiment, the leaching is controlled so that at least about 90% of sulfide that is leached from the sulfide source material is converted to hydrogen sulfide during said leaching.

In another embodiment, the leaching is controlled so that at least about 99% of sulfide sulfur that is leached from the sulfide source material is converted to hydrogen sulfide during said leaching.

In another embodiment, the process further comprises selecting the sulfide source material to contain at least one value metal selected from the group consisting of nickel, copper, zinc and cobalt, and mixtures thereof and to additionally contain at least one of gold and platinum group metal and the leaching is controlled so that the gold and platinum group metals are essentially not leached.

In another embodiment, the process further comprises selecting the sulfide source material to contain at least one value metal selected from the group consisting of nickel, copper, zinc and cobalt, and mixtures thereof and to additionally contain at least one of gold and platinum group metals and the leaching is controlled so that less than 10 weight percent of the gold and platinum group metals are leached.

In another embodiment, the leaching is controlled by adjustment of the pH and the redox potential.

In another embodiment, the process further comprises adjusting the redox potential of the lixiviant to be from 250 to 600 mV.

In another embodiment, the process further comprises adjusting the pH of the lixiviant at the end of the leach to be less than 2.5.

In another embodiment, the process further comprises adjusting the lixiviant so as to have a concentration of chloride ions of from 200-500 g/L.

In another embodiment, the process further comprises selecting the amount of hydrochloric acid that is added to obtain a selected pH.

In another embodiment, the process further comprises selecting the sulfide source material from a base metal sulfide ore or a material derived from a base metal sulfide ore.

In another embodiment, the chloride comprises an alkali metal chloride, magnesium chloride and calcium chloride, and mixtures thereof, and the oxidant comprises an alkali metal peroxide, alkali metal perchlorate, ammonium perchlorate, magnesium perchlorate, alkali metal chlorate, alkaline earth metal perchlorate, chlorine, alkali metal hypochlorite, hydrogen peroxide and peroxysulfuric acid, and mixtures thereof.

In another embodiment, the process further comprises conducting the leach at atmospheric pressure.

In accordance with another aspect of the present invention, there is provided a process for leaching a value metal from a sulfide ore comprising leaching the sulfide ore with a lixiviant comprising hydrochloric acid, a metal chloride, and an oxidant to obtain a leachate and a solid residue, wherein the redox potential is maintained sufficiently low to essentially not leach platinum group metals and gold from the sulfide ore material and to essentially convert the sulfide sulfur which is leached from the sulfide ore to hydrogen sulfide.

In one embodiment, the sulfide ore comprises a base metal sulfide ore, a concentrate of a base metal sulfide ore, tailings from the processing of a base metal sulfide ore and mixtures thereof. Preferably, the sulfide ore is unroasted prior to being leached. Preferably, the leach is conducted at atmospheric pressure.

In another embodiment, at least 90% by weight of the sulfide sulfur that is leached from the sulfide ore material is converted to hydrogen sulfide.

In another embodiment, the process further comprises the step of treating at least some of the hydrogen sulfide to obtain elemental sulfur.

In another embodiment, the pH of the lixiviant at the end of the leach is less than 2.5, preferably less than 1.5, more preferably less than 1 and most preferably less than 0.

BRIEF DESCRIPTION OF THE DRAWINGS

The present invention will be described with reference to the preferred embodiments of the invention shown in the drawings, in which.

DETAILED DESCRIPTION OF THE INVENTION

The present invention relates to a process for the leaching of a value metal from a base metal sulfide source material. The base metal sulfide source material may be present with a base metal oxide source material. For example, the source material may be a mixture of sulfide and oxide-based ores.

The ores may be an ore per se, but is preferably a concentrate thereof. In other embodiments, the ore may be in the form of any of the mattes discussed above, especially converter matte, or in the form of tailings of a base metal sulfide ore. It is understood that the expression "ore" also includes an ore and any materials derived from an ore. Preferably, the ore is unroasted.

In embodiments of the invention, the ore comprises, and preferably consists essentially of, an ore known as pyrrhotite, pentlandite, chalcopyrite, arsenopyrite, sphalerite, a pyrite and mixtures thereof. As noted above, the ore may be a mixture of oxide and sulfide ores. Thus, in embodiments, the ore may additionally contain laterite ore or concentrate e.g. saprolite or limonite.

The base metal sulfide ores preferably contain at least one of nickel, cobalt, copper and zinc, as well as at least one platinum group metal (PGM) and/or gold. The value metal content of the ore may vary widely in type and amount, depending on the source of the ore. In particularly preferred embodiments, the present invention is directed to the recovery of nickel from base metal sulfide ores, especially nickeliferous sulfide-based ores and mixtures of such ores with related oxide ores.

The process of the present invention may be operated without pre-treatment of the base metal sulfide ore. In particular, the process may be operated without roasting of the ore. However, it may be beneficial to subject the ore to a grinding or beneficiation step prior to leaching. In particular embodiments of the invention, the ore to be treated may be in the form of a concentrate, and in further embodiments the ore to be treated may have been subjected to smelting or other steps to form a matte. Such steps are known, and are for example discussed in the references noted above.

Figure 1:
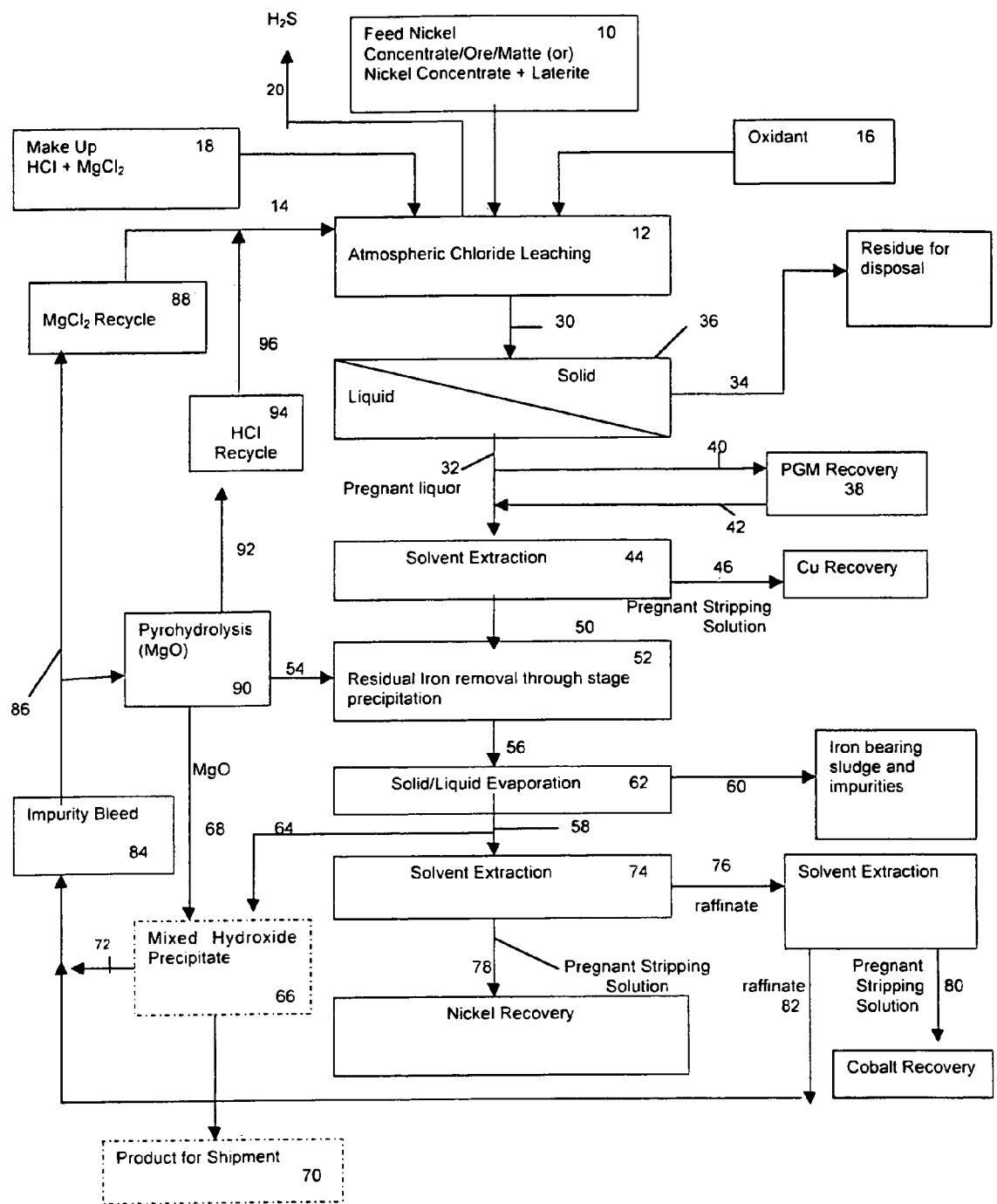
FIG. 1 shows a flow sheet for the recovery of value metals from sulfide-based nickeliferous ore or concentrate; and, FIG. 2 shows an alternate flow sheet for the recovery of value metals from sulfide-based nickeliferous ore or concentrate.
Figure 2:
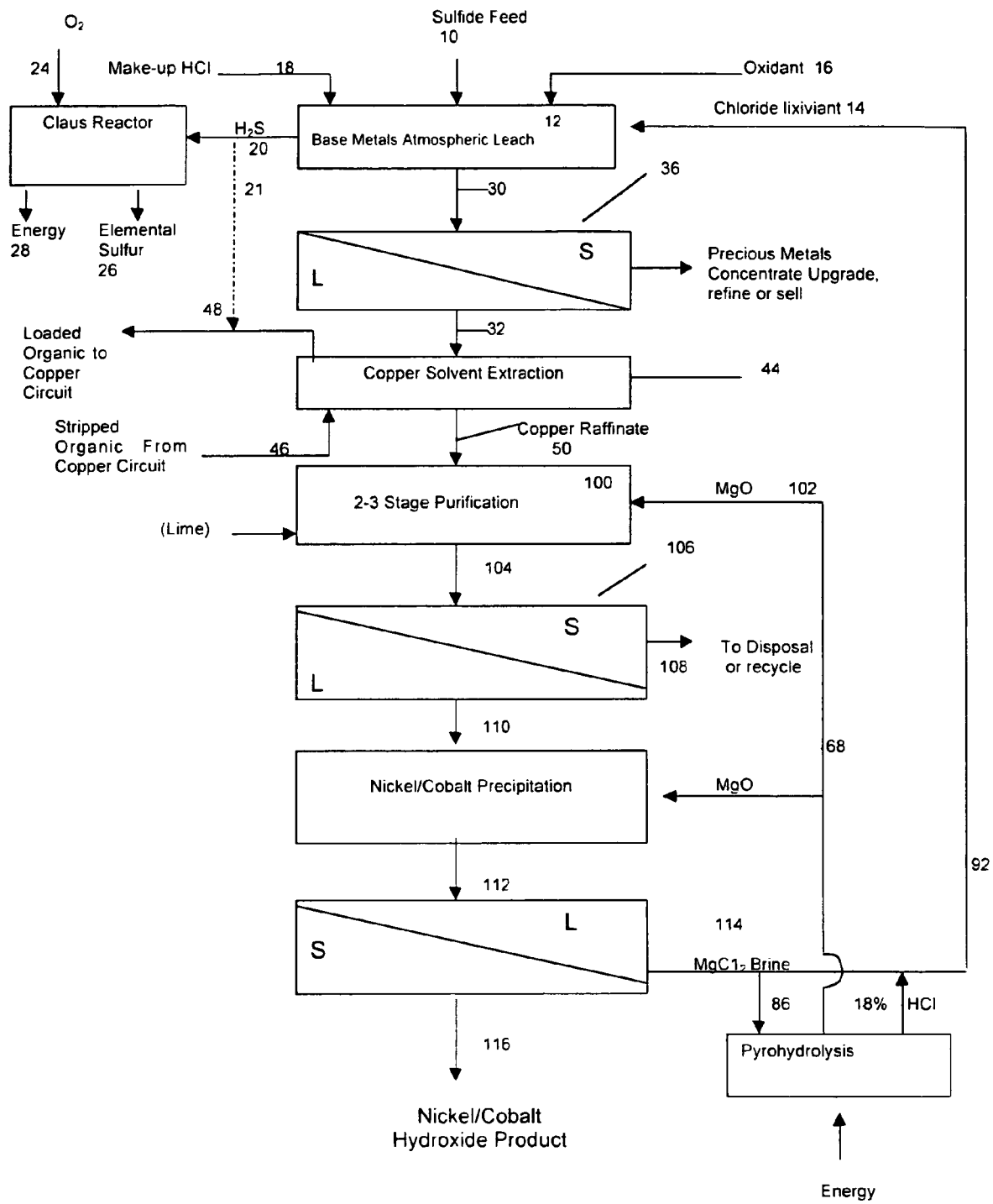

Referring to FIG. 1 and FIG. 2, ore 10 in a form as discussed above is fed to a leaching step 12 in which the ore 10 is contacted and leached with a lixiviant comprising at least one chloride, hydrochloric acid and at least one oxidant.

The chloride may comprise alkali metal chlorides, alkaline earth metal chlorides, ferric chloride and mixtures thereof. Preferably, the chloride is selected from the group consisting of alkali metal chlorides, magnesium chloride, calcium chloride and mixtures thereof. Preferred examples of alkali metal chlorides include sodium chloride and potassium chloride. The preferred chlorides are sodium and magnesium chloride and the chloride may comprise and more preferably consists essentially of one or both of these chlorides. Most preferably, the chloride comprises or consists essentially of magnesium chloride. Mixtures of chlorides may be used.

The oxidant may comprise alkali metal peroxides, alkaline earth metal peroxides, alkali metal perchlorates, alkaline earth metal perchlorates, ammonium perchlorate, magnesium perchlorate, alkali metal chlorates, alkaline earth metal chlorates, alkali metal hypochlorites, alkaline earth metal hypochlorite, chlorine, hydrogen peroxide and peroxysulfuric acid, and mixtures thereof. Preferably, the oxidant is selected from the group consisting of alkali metal peroxides, alkali metal perchlorates, ammonium perchlorate, magnesium perchlorate, alkali metal chlorates, alkaline earth metal chlorates, alkali metal hypochlorites, chlorine, hydrogen peroxide and peroxysulfuric acid, and mixtures thereof. Preferred examples of alkali metal peroxide are sodium peroxide and potassium peroxide. Preferred examples of alkali metal perchlorates are sodium perchlorate and potassium perchlorate. A preferred example of an alkali metal hypochlorite is sodium hypochlorite. Ammonium perchlorate, magnesium perchlorate and peroxysulfuric acid (Caro's acid, $H_2SO_5$) may also be used. Preferred examples of alkali metal chlorates are sodium chlorate and potassium chlorate. The preferred oxidants are chlorine, sodium hypochlorite, sodium perchlorate and sodium chlorate and the oxidant may comprise and more preferably consists essentially of one or more of these oxidants.

The leaching step may be conducted in any manner known in the art. For example, the leach may be conducted continuously as a co-current step, a countercurrent step or in another manner, or the leaching step may be conducted as a batch step. The leaching step is preferably carried out at atmospheric (ambient) pressure i.e. it is not necessary to conduct the leaching step under pressure. In particular, in accordance with the instant invention, a leaching step having good reaction kinetics may be conducted at atmospheric pressure. In prior art processes, elevated pressures are required to obtain reaction kinetics sufficient rapid to enable a commercial process.

It has surprisingly been determined that the formation of sulfate and the co-dissolution of PGMs and gold may be reduced, and preferably substantially reduced, by appropriate selection of the redox potential and the pH of a lixiviant containing hydrochloric acid and metal chlorides.

The Eh (redox potential versus SHE (standard hydrogen electrode)) may be maintained in the range of 250-600 mV, preferably from 250-450 mV and most preferably from 350-450 mV. If the redox potential is less than about 250 mV, then the lixiviant is highly reductive and base metal sulfides in the ore will not be leached at an appreciable rate. If the redox potential is higher than about 600 mV, then the PGMs and gold will co-dissolve at an appreciable rate and sulfides leached from the ore will be converted to sulfates at an appreciable rate. Accordingly, it is preferred to maintain the redox potential sufficiently high to leach base metal sulfides from the ore but sufficiently low so as to essentially limit the co-dissolution of PGMs and gold and to convert sulfur that is associated with metal sulfides in the ore and is leached from the ore (i.e., sulfide sulfur) to hydrogen sulfide.

The amount of oxidant relates to the redox potential (Eh) of the leaching solution. A particular ore will have an emf. The amount of oxidant that is present in the lixiviant may be adjusted to obtain a desired redox potential for the lixiviant.

The pH of the lixiviant solution, as measured by conventional equipment, at the end of the leaching operation may be in less than 2.5, although it is preferable for the pH to be less than 1.5, more preferably less than 1.0 and most preferably in the range 0-0.8. It is to be understood that the pH in the leach solution will vary, and might be in the range of 0.5-4.0 initially. However, in order to reduce the residence time of the leaching step, the pH is preferably maintained in the selected range for most (e.g., more than about 50%) of the duration of the leaching step. At a pH higher than about 0.6 iron commences to precipitate as hematite and magnetic hydroxide (e.g., spinel). The precipitation of iron substantially increases when the pH is above about 1-1.5. Accordingly, it is preferred to maintain a low pH, especially if there are significant amounts of PGMs and/or gold in the ore. In one preferred embodiment, if the ore contains amounts of PGMs and/or gold that are not sufficient to warrant a separate recovery step, then it is preferred to conduct the leach so as to leach the iron and to precipitate the iron. The leaching and the precipitation may be conducted in a single step (e.g., reactor). Alternately, the leach may be conducted, the solids removed and the leachate then treated to precipitate the iron, thereby producing a separate iron residue for recovery of iron or disposal. Alternately, if it is desired to recover the PGMs and gold, then it is preferred to maintain the leached iron in the leachate so that the solid residue is relatively free of iron, thereby simplifying the recovery of the PGMs and gold.

The pH of the lixiviant is reduced by providing a sufficient concentration of chloride in the lixiviant. Accordingly, the chloride concentration of the lixiviant from all sources is adjusted to obtain the selected pH. The chloride concentration may be in the range 200-500 grams of chloride ions per litre of lixiviant solution, preferably 200-400 g/L and, more preferably 300-400 g/L. The upper limit on the chloride concentration may depend on the ions present in the leach solution, especially as a result of leaching of the ore, and resultant formation of complexes. In particular, the chloride concentration is preferably selected to minimize formation of anionic chloro complexes, especially of ferric iron, $FeCl_4^-$.

In preferred embodiments of the invention, the chloride ions are derived from metal chlorides and hydrochloric acid, and the chloride concentration of, e.g., 200-400 g/L, is calculated on the basis of the amount of chloride ions in solutions from both the metal chlorides and the hydrochloric acid in the lixiviant solution. In particularly preferred embodiments, the amount of hydrochloric acid may be in the range of 30-150 g/L and the amount of metal chloride (e.g., magnesium chloride) may be in the range of 80-350 g/L.

The metal chloride/HCl (metal to hydrochloric acid) ratio expressed in terms of mass percentage (m/m) in the leach is preferably adjusted to optimize the leach, based on, for example, the particular ore being leached and the temperature of the leaching step. The metal/HCl ratio of the chloride lixiviant solution may be in the range of 0.1-2.0:1 and, preferably 0.4-1.0:1.

The leach is preferably carried out at a temperature in the range of 75° C. up to the boiling point of the leach solution at ambient pressure, which is about 115° C.

The leach may be carried out with a lixiviant having a low concentration of hydrochloric acid. Preferably, the hydrochloric acid is added in an amount sufficient to leach all of the base metals and, if desired, the iron and to obtain the selected pH. Therefore, the amount of hydrochloric acid that is added is preferably about the stoichiometric amount of acid required to leach the selected value metals and maintain the lixiviant in a selected pH range and, more preferably, a slight excess (e.g., 105%). Therefore, the amount of acid that is added to the lixiviant may be determined by monitoring the pH of the lixiviant during the leaching step and adding additional acid as the pH of the lixiviant increases above a selected value. The amount of acid that is required will vary depending upon the concentration of value metals in the ore the composition of the ore. In particular, higher amounts of acid will generally be required if the ore is more concentrated. Similarly, different sulfides require a different amount of acid during the leaching process. For examples, the overall reactions that can occur during the leaching are as follows.

Chalcocite $Cu_2S+2HCl+Cl_2 \rightarrow H_2S+2CuCl_2$
$2Cu_2S+8HCl+O_2 \rightarrow 2H_2S+4CuCl_2+2H_2O$
Covellite $CuS+2HCl \rightarrow H_2S+CuCl_2$
Bornite $2Cu_5FeS_4+16HCl+5Cl_2 \rightarrow 8H_2S+10CuCl_2+2FeCl_3$
Chalcopyrite $2CuFeS_2+8HCl+Cl_2+4H_2S+2CuCl_2+2FeCl_3$
$4CuFeS_2+20HCl+O_2 \rightarrow 8H_2S+4CuCl_2+4FeCl_3+2H_2O$
Enargite $2Cu_3AsS_4+6HCl+8H_2O \rightarrow 8H_2S+6CuCl_2+2H_3AsO_4$
Pentlandite $Ni_9S_8+16HCl+Cl_2 \rightarrow 8H_2S+9NiCl_2$
$2Ni_9S_8+36HCl+O_2 \rightarrow 16H_2S+18NiCl_2+2H_2O$
Subsulfide $Ni_3S_2+4HCl+Cl_2 \rightarrow 2H_2S+3NiCl_2$
$2Ni_3S_2+12HCl+O_2 \rightarrow 4H_2S+6NiCl_2+2H_2O$
Spalerite $ZnS+2HCl+H_2S+ZnCl_2$
Cobaltite $4CoAsS+8HCl+6H_2O+5O_2 \rightarrow 4H_2S+4CoCl_2+4H_3AsO_4$
Arsenopyrite $FeAsS+3HCl+H_2O+O_2+H_2S+FeCl_3+H_3AsO_4$
Galena $PbS+2HCl+H_2S+PbCl_2$ For example, a 30% Ni concentrate will require much more acid (e.g., 10-20 times) than a 3% Cu ore. Accordingly, the concentration of hydrochloric acid in the lixiviant may be 1-4N and may be less than 18% (mass ratio). Use of such a low concentration of hydrochloric acid, and control of the redox potential Eh and pH, are believed to be important aspects of the control of the form of the sulfur that is obtained from the sulfide in the ore i.e. conversion of the sulfide sulfur to hydrogen sulfide, rather than sulfate ion. The amount and type of oxidant used are factors in the control of Eh.

In particularly preferred embodiments, the lixiviant and leaching conditions are chosen so that base metals are leached from the base metal sulfide ore but platinum group metals (PGMs) and gold are essentially not leached i.e. the PGMs and gold remain as part of the solids in the leach and are separated as solids by liquid/solids separation, as discussed herein. Control of the leach so that PGMs and gold are separated as solids simplifies subsequent steps for recovery of value metals. It will be appreciated that in the preferred embodiment of the invention, the leaching step is controlled so that the sulfide sulfur in the sulfide ore material is converted to hydrogen sulfide, rather than sulfate and that the PGMs and gold are essentially not leached (e.g., less than 10%, preferably less than 5% and more preferably, less than 1%). However, it will be appreciated that, depending upon the subsequent recovery steps, some PGMs and gold may be leached during the base metal leach step and/or some sulfate may be produced.

As discussed herein, in the preferred embodiment of the invention the leaching step is controlled so that sulfur in the sulfide ore material is converted to hydrogen sulfide, rather than sulfate. In this embodiment, the hydrogen sulfide is stripped from the leach solution, most preferably stripped from the leach solution in a continuous manner so that the concentration in the leach solution of hydrogen sulfide is low. In preferred embodiments, a gas e.g. air or nitrogen, is fed to the leach solution to aid in the stripping of hydrogen sulfide.

It will be appreciated that at least some of the spent lixiviant is preferably regenerated and fed to leaching step 12. As shown in FIGS. 1 and 2, a recycled chloride lixiviant stream 14, as well as an oxidant stream 16 and a make up stream of chloride 18 are combined to produce the lixiviant that is used during the leaching step. It will be appreciated that leaching step 12 may be conducted in a single reactor or a plurality or reactors in series or parallel. Preferably, leaching step 12 comprises a single leaching reactor. It will also be appreciated that some or all of streams 14, 16 and 18 may be combined in any particular order prior to being introduced into the reactor or reactors in which leaching step 12 is conducted.

The hydrogen sulfide stripped from the leach solution may be treated in a variety of ways, preferably for recovery of elemental sulfur, as will be apparent to persons skilled in the art. For instance, as shown in FIG. 2, the hydrogen sulfide stream 20 may be subjected to a Claus reaction in step 22. In a typical Claus reaction, an oxygen stream 24 is added and part of a stream of hydrogen sulfide is oxidized to form sulfur dioxide, and the sulfur dioxide is then reacted with remaining hydrogen sulfide to form elemental sulfur 26. The chemical reaction may be described as follows:

$$2H_2S+3O_2 => SO_2+H_2O$$

$$3H_2S+\tfrac{3}{2}O_2 => 3/n\, S_n+H_2O$$

The reaction may be carried out in more than one stage, using more than one catalyst, and high efficiencies of recovery of elemental sulfur e.g. 94-97%, may be achieved. The Claus reaction is an exothermic reaction, and energy generated 28 (e.g. in the form of a heated liquid that is circulated in a heat exchanger) may be sent to the leaching process (e.g. an indirect heat exchanger) or used elsewhere in the process.

In other embodiments, the hydrogen sulfide may be contacted with a solution of a metal that will form a sulfide, especially a solution of a copper salt. The copper salt may be obtained from the spent lixiviant such as by selective solvent extraction and stripping. For example as shown by dotted line in FIG. 2, stream 21 of hydrogen sulfide may be may be combined with the pregnant strip solution produced in extraction step 44. Examples of copper salts include cuprous chloride and cupric sulfate. If the recovery process is a so-called stand-alone process, i.e. streams of liquids in the sulfur recovery process are not recycled to the process for leaching and recovery of metal values from the sulfide ore material, then a variety of copper salts could be used. However, if streams from the sulfur recovery process are or might be recycled to the process for leaching and recovery or metal values, then it is particularly preferred that the copper salt be cuprous chloride. The leaching step is a chloride process, and use of cuprous chloride reduces or eliminates contamination of the leaching step with anions other than chloride. Contacting hydrogen sulfide with cuprous chloride solution results in the formation of copper (cuprous) sulfide, which may be separated in a liquid/solids separation step. The liquid may be recycled and recontacted with hydrogen sulfide. Copper sulfide may be converted to copper sulfate and elemental sulfur.

The leaching conditions, and especially the lixiviant, redox potential Eh and pH, may be controlled so that at least 50%, preferably at least 90% and most preferably at least 99% by weight of the sulfide sulfur that is leached from the sulfide ore material is converted into hydrogen sulfide. Under appropriate conditions, at least 99.9% and particularly at least 99.95%, by weight of the sulfide sulfur in the sulfide ore material may be converted into hydrogen sulfide.

Preferably, the total amount of sulfate formed in the leaching step is less than 1%, more preferably less than 0.1% and most preferably less than 0.05%, by weight of the amount of sulfur in the sulfide ore material 10 that is leached from the ore during leaching step 12. The formation of hydrogen sulfide, which is stripped, and the low levels of sulfate, simplifies subsequent steps in the recovery of value metals and/or recovery and recycling of components of the leach solution.

The leach mixture 30 comprises a value metal-rich solution (leachate) 32 and a residue (solids) is in the form of a suspension 34. The leach mixture 30 is fed to a solid/liquid separation step 36 to effect separation of the leachate 32 from the solids 34. The solids 34 may include unleached ore (e.g., the PGMs and gold) and iron solids, although it would be preferable to maintain iron in solution if significant values of PGMs and/or gold are in the ore feed. Techniques for such separation are known e.g. using a pressure or vacuum filter, counter-current decantation or centrifuge.

Solids 34 may comprise a magnetic portion, which may be separated and which might be useful for production of ferronickel or low-alloy stainless steels.

The PGMs and gold in the solids 34 may be recovered by any means known in the art. Preferably, solids 34 are leached to dissolve the PGMs and gold. Preferably, the lixiviant may be any of those taught herein for leaching the base metals, except that the redox potential is preferably greater than 700 mV and, more preferably, greater than 800 mV. In a particularly preferred embodiment, the lixiviant has the same composition as that used to leach the base metals from the sulfide ore except that the composition has been adjusted to increase the redox potential.

As discussed above, it is preferred that the leach be carried out so that the platinum group metals, and gold and optionally at least a portion of the silver, are not leached so that they may be separated with the leach residue, and separated therefrom using known techniques. If some of the platinum group metals and gold are in leachate stream 32 that is separated in liquid/solids separation step 36, then some or all of leachate 32 may be subjected to PGM separation step 38 to recover the PGM and gold, and silver if any is present. As shown in FIG. 1, a bleed stream 40 may be removed from leachate 36 and subjected to PGM separation step 38. A PGM- and gold-poor leachate stream 42 is returned to leachate stream 32. PGM separation step 38 may be any process known in the art to remove dissolved PGMs and gold, and optionally silver if present. Preferably, PGM separation step 38 is a cementation step e.g. using copper, zinc or inorganic or organic reductants e.g. sodium borohydride or hydrazine.

The solids separated in liquid/solid separation step 36 may contain copper sulfide, depending on the Eh of the leach solution, and may be recovered by any process known in the art.

In embodiments of the invention, value metals e.g. nickel, copper, zinc and/or cobalt and PGMs and gold may be recovered from the leachate 32 by standard or other known methods e.g. ion exchange, solvent extraction, electrowinning or sulfide precipitation. Examples are given in FIG. 1 and FIG. 2.

In one embodiment for the separation of value metals from the leachate 32, copper ions are present in leachate 32 from leaching of copper values from ore 12 or from the addition of copper salts e.g. copper chloride, or copper sulfide ($Cu_2S$) may be formed in the solution e.g. from hydrogen sulfide generated in the leach. As shown in FIGS. 1 and 2, copper could be recovered from the leachate 32 by subjecting leachate 32 to a solvent extraction step 44 to obtain a copper reduced leachate 50. Accordingly, leachate 32 could be contacted with an appropriate extraction solution 46 to obtain a copper rich solution 48 that is treated to recover copper. The extraction solution 48 may then be regenerated and recycled as is known in the art to obtain extraction solution 46. It is however preferred to form hydrogen sulfide in the leach and strip the hydrogen sulfide from the leach solution, as discussed herein.

The copper reduced leachate 50 may also contain iron as Iron chloride. As shown in FIG. 1, the iron may be recovered from leachate 50 by the addition of magnesium oxide 54 to precipitate an iron oxide (such as hematite or spinel) or a hydrated iron oxide in precipitation step 52. The former are preferable since they are easier to effect solid/liquid separation. The leach mixture 56 comprises a value metal-rich solution (leachate) 58 and a residue (solids) is in the form of a suspension 60. The leach mixture 56 may be fed to solid/liquid separation step 62 as is known in the art to effect separation of the leachate 58 from the solids 60. Solids 60 may be treated to recover value metals therefrom and/or disposed as spent solids. The iron may alternately be recovered by being pyrohydrolysed to form an oxide.

As shown in FIG. 1, a portion of leachate 58 may be removed via stream 64 and then subjected to precipitation step 66. For example, magnesium oxide stream 68 may be combined with stream 64 to form a mixed hydroxide precipitate (e.g., nickel/cobalt hydroxide) to produce product 70 and a value metal depleted leachate 72. The remainder of leachate 58 may contain nickel and cobalt that may be individually recovered in separate recovery steps. For example, a portion of leachate 58 may be subjected to a solvent extraction step 74 to obtain a cobalt rich extraction solution 76 and a cobalt reduced leachate 78. The cobalt rich extraction solution may be treated to obtain a cobalt containing solution 80 and a value metal depleted leachate 82. Cobalt reduced leachate 78 may be treated to recover nickel and a value metal depleted leachate stream.

The value metal depleted leachates may be combined and treated to regenerate the lixiviant. In particular, the metal chloride and hydrochloric acid may be regenerated. Further, magnesium oxide used in the value metal recovery steps may be obtained. Referring to FIG. 1, a bleed stream of value metal depleted leachates may be treated in step 84 to remove impurities therefrom. A portion of the purified value metal depleted leachate 86 may then be treated in step 88, such as by hydroxide or sulfide precipitation to obtain metal chloride (e.g., magnesium chloride) for recycle. A portion of the purified value metal depleted leachate 86 may be subjected to pyrohydrolysis step 90 to obtain magnesium oxide stream 54, 68

The magnesium oxide reduced leachate 92 produced by hydrolysis step 90 comprises HCl that may be subjected to additional evaporation steps 94 to obtain recycle HCl. Off-gases from pyrohydrolysis may be used in pre-evaporation (not shown), to enrich the solution in HCl and reduce energy costs. However, the degree of partial or pre-evaporation may be reduced, or even eliminated, by feeding gaseous hydrogen chloride to the solution. The hydrogen chloride may be formed from chlorine. In this manner, energy required for evaporation of water may be reduced or eliminated.

In the alternate embodiment shown in FIG. 2, leachate 50 is treated in two or three purification steps 100 to recover value metals that are precipitated from solution by the addition of magnesium oxide, which is provided by stream 102. After each purification step 100, a treated leachate 104 is subjected to solid/liquid separation step 106 to obtain a solid 108, which may be sent for disposal or for further processing to isolate the value metal, and a value metal reduced leachate 110. Subsequently, the treated leachate is subjected to a nickel/cobalt recovery step 112 to obtain a value metal reduced leachate 114, which may be recycled by pyrohydrolysis step 90, and a mixed nickel/cobalt hydroxide product, which may then be subjected to further processing to isolate the value metals. Alternately, the leachate may be treated sequentially to produce a nickel-containing product and cobalt-containing product.

It will be appreciated that by sequentially adding additional amounts of magnesium oxide, the pH of the leachate may be sequentially increased so as to precipitate a particular metal or group of metals. It will also be appreciated that the pH of the leachate may be adjusted by various means, including the addition of different pH adjustment agents (e.g. bases). An advantage of the use of magnesium oxide is that the required amount of magnesium oxide may be produced by the process and the addition of magnesium oxide does not add any additional ions in the leachate, which may require the use of additional treatment steps.

The lixiviant, especially redox potential (Eh), is controlled to effect conversion of sulfide in the sulfide ore material fed to the leaching step into hydrogen sulfide, rather than sulfate ion. The hydrogen sulfide is preferably stripped from the leaching step as gaseous hydrogen sulfide. In the embodiment in which hydrogen sulfide is formed, formation of sulfate may be reduced to very low levels e.g. 0.05% by weight or lower based on the total amount of sulfide sulfur leached from the ore, as exemplified herein, which facilitates separation of value metals in subsequent steps in the process.

Thus, in preferred embodiments of the present invention e.g. as shown in FIG. 1 and FIG. 2, the present invention provides for the use of mixtures of magnesium chloride, at least one oxidant and hydrochloric acid in the leach step. Sulfide in the ore may be separated as elemental sulfur, or most preferably as hydrogen sulfide. The dissolution of iron may be controlled and minimized, without requiring expensive pre-treatment or post-treatment steps by adjustment of chloride concentration, pH, kinetics, redox and/or temperature. For example, lower leaching temperatures, lower chloride concentrations and a higher pH decrease the tendency of iron to be leached. Therefore, the temperature, chloride concentration and pH conditions for the leach may be selected, in part, based on the amount of iron to be leached. Subsequent to the iron being leached, the pH may be increased, preferably above 1.5 to precipitate the leach iron. The leach residue may be maintained in a form that is readily filterable. As discussed herein, the process is preferably controlled so that hydrogen sulfide is formed during leaching, and stripped from the leach solution prior to subsequent liquid/solids separation of the leach solution.

In the process of the present invention, the metal chloride/HCl ratio e.g. metal/HCl ratio and the amount and type of oxidant in the leach step may be adjusted to reflect any specific requirements or characteristics of the process and ore fed to the process. In some instances, all of the chloride ion in the leach solution may be supplied from, for example, recycled magnesium chloride.

The leaching of the base metals may be conducted continuously in at least one stirred tank reactor. Alternately, at least two reactors may be used, the first for addition of base metal sulfide ore and the second for removal of the leached iron (e.g., increasing the pH to precipitate the iron either as part of the solid residue from the leach or, as shown in FIG. 1, in a separate precipitation step 52 downstream from solid/liquid separation step 36). Should there be significant PGM and/or gold values in the feed, it will be preferable to maintain the iron in solution until after separation of the leach residue, which will be a PGM and/or gold concentrate. If there are no PGM and/or gold values present, then the iron will be precipitated into the leach residue by adjustment of the parameters indicated above. Three or more reactors may be more optimal. Process control may be effected by the rates of addition of base metal sulfide ore and/or lixiviant solution to the process, but it may be preferable to control the process using pH and redox potential Eh. As discussed above, the leaching may also be conducted batch, co-current or counter-current, in whole or in part. It will also be appreciated that any of the downstream process steps may be conducted on a continuous or a batch basis.

An increase has been recognized in the activity of HCl when salts such as NaCl, $CaCl_2$ and $MgCl_2$ are added to dilute solutions of HCl. Without being limited by theory, the increase in the reactivity of HCl is understood to be a function of chloride ion concentration, especially of magnesium chloride. Magnesium chloride has a high hydration rate, which is believed to cause substantially increased activity of hydrogen ions in the lixiviant solution. However, as illustrated by comparative experiments below, especially Example II, use of constant chloride concentrations in hydrochloric acid leaching of nickeliferous ore can lead to widely different levels of extraction of nickel.

The process provides for removal of sulfide sulfur derived from the sulfide ore as hydrogen sulfide, rather than the formation of sulfates. The preferred embodiment of removal of sulfur as hydrogen sulfide simplifies and/or allows for alternate steps for separation and recovery of value metals subsequent to the leaching step, because sulfate is present in not more than very minor amounts, as exemplified herein. In addition, leaching conditions, especially pH, redox potential (Eh) and chloride concentration, may be controlled thereby providing for control of leaching of value metals, formation of chloride complexes and extraction of iron, in addition to control so that sulfide sulfur is converted to hydrogen sulfide. The process of the present invention does not require pre-treatment of the base metal sulfide ore prior to the leaching step.

A particular advantage of the process of the present invention is that both high rates of extraction of value base metals and removal of sulfur hydrogen sulfide may be obtained in a leaching step that operates at atmospheric pressure. The use of low concentrations of hydrochloric acid and the use of high levels of chloride in the lixiviant, preferably magnesium chloride, at the selected redox potential results in the formation of hydrogen sulfide. The hydrogen sulfide is stripped from the leach solution, and results in very low amounts of sulfate in leachate and solids from the leach solution. This has significant economic advantages in subsequent steps for recovery of value metals and PGMs and gold. In addition, the use of the low concentrations of hydrochloric acid does not effect leaching of PGMs and gold from the ore, which also simplifies subsequent steps in the recovery of value metals from the leachate. The use of atmospheric pressure results in substantial economic advantages, especially in capital costs. The use of chloride chemistry offers advantages in operating and capital costs of the process. The leaching agent is regenerated and recycled, preferably using a pyrohydrolysis step with additional hydrochloric acid being formed from chlorine if required. Magnesium chloride is the preferred chloride, as it is more readily recycled to the leaching step. Additionally, the use of magnesium chloride with hydrochloric acid and oxidant as lixiviant is preferred.

While not being bound by any theory, the high activity of $H^+$ ions in the high strength chloride solutions, especially magnesium chloride solutions, is believed to enable use of lower concentrations of hydrochloric acid to effect leaching of value metals, and in embodiments it is believed that the amount of acid required may be only marginally higher than the stoichiometric amount of acid. The high activity of the proton, $H^+$, in high concentration chloride solutions permits even small amounts of acid to act as though it were highly concentrated, and therefore has a driving force and hence very little excess over stoichiometric acid is required. Where the proton activity is not so high, then considerable excess acid is required to drive the leaching reaction. There is lower water activity in the chloride solutions, which is believed to result in lower concentrations of iron in solution, but with the relatively low amounts of iron in the ores percentage extraction is still high. The presence of magnesium ions in magnesium chloride solutions is believed to reduce dissolution of magnesium as a result of common ion effects. Use of magnesium chloride permits recycle of both hydrochloric acid and caustic (highly reactive) magnesia, both of which may be used in the process. The high proton activity achievable at the low acid concentrations herein permits the process to be operated under conditions that cause formation of hydrogen sulfide rather sulfate ion, so-called reductive leaching conditions at low redox potential. It is also believed that the low redox potential used in the process not only results in the formation of hydrogen sulfide instead of sulfate but also is not conducive to leaching of PGMs and gold. Both of these aspects are advantages of the process of the present invention.

The present invention is illustrated by the following examples.

Example I

A series of comparative laboratory-scale leaching experiments were carried out using a base metal sulfide ore concentrate that was a mixture of pyrrhotite, pentlandite and chalcopyrite. The ore concentrate had the following analysis: Ni (18.65%), Cu (1.38%), Co (0.19%) and Fe (26.6%). The leach solution (approximately 500 mL) was a hydrochloric acid (2N in Runs 1 and 3, 4N in Run 2) solution containing 20 w/w of solids. Ferric chloride ($FeCl_3.6H_2O$) was added to each leach solution, so that the total chloride ion content (from HCl and ferric chloride) was 230 g/L. The temperature of the solution was 95° C. and the leaching time was 4 hours. The redox potential (Eh) was measured in mV. The pH was less than 0.

Oxidant was not added in Runs 1 and 2. In Run 3, chlorine gas was bubbled through the leach solution at a rate of 0.5 mL/min.

The leached solution was subjected to a liquid/solids separation step. The washed solids obtained were subjected to analysis for the content of nickel, iron, cobalt and copper, and the liquid was subjected to analysis for nickel. The extraction of each metal was then calculated.

The results obtained, expressed as percentages based on the concentrate fed to the leach solution, are shown in Table I. Table I shows the redox potential, in mV, at the end of the leach.

TABLE I

|  | Run 1 | Run 2 | Run 3 |
|---|---|---|---|
| Redox potential (Eh) | 170 | 235 | 510 |
| Ni extraction (solids) | 36 | 23 | 84 |

TABLE I-continued

|  | Run 1 | Run 2 | Run 3 |
|---|---|---|---|
| Ni extraction (liquid) | 47 | 23 | 65 |
| Fe (solids) | 70 | 46 | 68 |
| Co extraction (liquid) | 70 | 16 | 56 |
| Cu extraction (liquid) | 75 | 15 | 63 |

The results show that leaching of the sample using leach solution of hydrochloric acid and ferric chloride resulted in poor leaching of nickel (below 50% extraction) except when chlorine was bubbled through the leach solution (Run 3). The leach solution of Run 3 exhibited a higher redox potential.

Example II

In further comparative experiment, the procedure of Example 1 was repeated using 2N hydrochloric acid, except that for Run 4, the metal chloride was magnesium chloride ($MgCl_2.6H_2O$). The total chloride ion content was 300 g/L. The pH was <0.

The results obtained are given in Table II.

TABLE II

|  | Run 4 |
|---|---|
| Redox potential (Eh) | 410 |
| Ni extraction (solids) | 64 |
| Ni extraction (liquid) | 66 |
| Fe (solids) | 74 |
| Co extraction (liquid) | 58 |
| Cu extraction (liquid) | 79 |

The results show that the use of magnesium chloride (Run 4) improved the extraction of nickel from 47% to 66% as against Run 1, and was equivalent to ferric chloride and chlorine (Run 3) in the extraction of iron, cobalt and copper and slightly poorer in the extraction of nickel Example III The procedure of Example II was repeated, except that an oxidant was added to the leach solution, in order to illustrate aspects of the present invention. Thus, in each Run, the leach contained both magnesium chloride and an oxidant. The amounts, based on 500 mL of solution, are shown in Table III; chlorine was fed into the leach solution in the amount shown. In Run 5, the hydrochloric acid was 2N and the amount of total chloride ion concentration was 300 g/L. In Runs 6-9, the hydrochloric acid was 4N and the amount of total chloride ion concentration was 400 g/L. The pH was <0.

The results obtained are shown in Table III.

TABLE III

|  | Run 5 | Run 6 | Run 7 | Run 8 | Run 9 |
|---|---|---|---|---|---|
| Oxidant | $NaClO_3$ | $NaClO_3$ | $NaClO_3$ | $NaClO_3$ | $Cl_2$ |
| Amount of oxidant | 117 g | 0.25 g | 0.5 g | 0.75 g | 0.5 mL/min |
| $MgCl_2 \cdot 6H_2O$ | 112 g | 370 g | 370 g | 370 g | 370 g |
| Redox pot. (Eh) | 340 | 430 | 440 | 420 | 510 |
| Ni extrn. (solids) | 54 | 95 | 96 | 92 | 98 |
| Ni extrn. (liquid) | 57 | 78 | 86 | 88 | 92 |
| Fe (solids) | 32 | 91 | 92 | 88 | 98 |
| Co extrn. (liquid) | 55 | 90 | 88 | 85 | 96 |
| Cu extrn. (liquid) | 64 | 48 | 28 | 24 | 99 |

The results show that high extractions of nickel, especially in excess of 90%, may be obtained using leach solutions containing hydrochloric acid, magnesium chloride and an oxidant. In addition, while the extraction of nickel increases at redox potentials above 250 mV, the extent of the extraction of nickel increases substantially at redox potentials above 350 mV.

Example IV

A series of laboratory-scale leaching experiments were carried out using a base metal sulfide ore concentrate that was a mixture of pyrrhotite, pentlandite and chalcopyrite. The feed ore was received at 100%-100 mesh feed size. The ore concentrate had the following analysis: Ni (18.90%), Cu (1.52%), Co (0.28%) and Fe (29.0%). The leach solution (1 L) was a 4N hydrochloric acid solution containing 5% w/v of solids. The leach solution had a total chloride ion concentration of 400 g/L, obtained from hydrochloric acid and magnesium chloride (258.2 g/L) as Cl—. The leaching temperature was 95° C. and the leaching time was 4 hours. The redox potential (Eh) was measured in mV. Chlorine was bubbled through the leach solution as oxidant. The pH was <0.

$Cl_2$ was bubbled through the leach solution to strip hydrogen sulfide formed during the leach from the leach solution.

The leached solution was subjected to a liquid/solids separation step. The solids (washed) and liquid obtained were subjected to analysis for the content of nickel, iron, copper and cobalt. The extraction of each metal was then calculated. The liquid was also subjected to analysis for sulfate.

The results obtained, expressed as percentages based on the analysis of the solids and liquid for each metal, are shown in Table IV. The analysis for sulfate is reported as both g/L of sulfate and percentage removal of sulfide sulfur as hydrogen sulfide. Table IV shows the redox potential, in mV, at the end of the leach. In each run reported in Table IV, visual examination of the solids showed no evidence of elemental sulfur.

TABLE IV

|  | Run 10 | Run 11 | Run 12 |
| --- | --- | --- | --- |
| Redox potential (Eh) | 190 | 186 | 295 |
| Ni extraction (%) | 87.9 | 59.4 | 67.6 |
| Fe extraction (%) | 83.5 | 72.3 | 73.2 |
| Cu extraction (%) | 34.8 | 50.0 | 61.7 |
| Co extraction (%) | 72.0 | 38.8 | 50.1 |
| Sulfate (liquid, g/L) | 0.011 | 0.020 | 0.010 |
| Removal of sulfide sulfur (%) | >99 | >99 | >99 |

The results show that in each of Runs 10-12 at least 99% of the sulfur, which was in the form of sulfide in the sulfide ore concentrate fed to the leach, had been removed during the leaching step. The amount of sulfate ion in the liquid obtained was very low.

Example V

The procedure of Example IV was repeated, except that chlorine was not bubbled through the leach solution. The oxidant used was sodium perchlorate, which was added in amounts as follows: Runs 13 and 14—20 kg/tonne of concentrate sample; Run 15—10 kg/tonne of concentrate sample. In addition to the sodium perchlorate, in Runs 14-15 oxygen was bubbled through the leach solution (1 L) at a rate of 100 mL/min. Sodium perchlorate was the only oxidant used in Run 13. The pH was <0.

The results obtained are shown in Table V. In each run reported in Table V, visual examination of the solids showed no evidence of elemental sulfur.

TABLE V

|  | Run 13 | Run 14 | Run 15 |
| --- | --- | --- | --- |
| Redox potential (Eh) | 405 | 250 | 365 |
| Ni extraction (%) | 96.1 | 51.2 | 97.3 |
| Fe extraction (%) | 90.4 | 65.5 | 92.2 |
| Cu extraction (%) | 81.7 | 52.4 | 79.3 |
| Co extraction (%) | 83.2 | 33.4 | 83.5 |
| Sulfate (liquid, g/L) | 0.004 | 0.042 | 0.007 |
| Removal of sulfide sulfur (%) | >99 | >99 | >99 |

The results for removal of sulfide sulfur using sodium perchlorate or sodium perchlorate/oxygen as oxidant are similar to those of Example IV in which chlorine was used as oxidant. High extractions of nickel, in excess of 90%, were obtained in Runs 13 and 15. This example shows that sodium perchlorate may be used as oxidant instead of chlorine. At least 99% of the sulfide sulfur was removed in all Runs.

Example VI

The procedure of Example V was repeated, except that the only oxidant used was sodium hypochlorite. A solution of sodium hypochlorite (5.25% w/v) was added as follows: Run 16—560 L/tonne of concentrate sample; Run 17—160 L/tonne of concentrate sample; and Run 18—960 L/tonne of concentrate sample. The pH was <0.

The results obtained are shown in Table VI. In each run reported in Table VI, visual examination of the solids showed no evidence of elemental sulfur.

TABLE VI

|  | Run 16 | Run 17 | Run 18 |
| --- | --- | --- | --- |
| Redox potential (Eh) | 398 | 295 | 190 |
| Ni extraction (%) | 98.2 | 98.8 | 42.2 |
| Fe extraction (%) | 91.9 | 89.5 | 56.6 |
| Cu extraction (%) | 85.8 | 75.7 | 43.2 |
| Co extraction (%) | 86.2 | 83.4 | 23.1 |
| Sulfate (liquid, g/L) | 0.023 | 0.017 | 0.018 |
| Removal of sulfide sulfur (%) | >99 | >99 | >99 |

The results for removal of sulfide sulfur using sodium hypochlorite as oxidant are similar to those of Examples IV and V, in which chlorine, sodium perchlorate and sodium perchlorate/oxygen were used as oxidant. High extractions of nickel, in excess of 90%, were obtained in Runs 16 and 17. In Run 18, the high concentration of sodium hypochlorite is believed to have resulted in re-precipitation of dissolved metals, but the removal of sulfide sulfur as hydrogen sulfide gas was still high.

Example VII

A series of laboratory-scale leaching experiments were carried out using a material identified as an anode slime material and oxidants such as sodium hypochlorite, sodium chlorate and oxygen. The anode slime material had the following analysis: Ni (5.1%), Cu (1.1%), Fe (1.2%), Au (7.01 g/t), Ag (2.20 g/t), Pt (24.40 g/t), Pd (87.90 g/t) and Rh (3.50 g/t). The sulfur content was 91.9 wt %, with the content of elemental sulfur being 80 wt %. The leach solution (1 L) was a 4N hydrochloric acid solution containing 5% w/v of solids. The leach solution had a total chloride ion concentration of 400 g/L, obtained from hydrochloric acid and magnesium chloride (258.2 g/L). The leaching temperature was 95° C. and the leaching time was 6 hours (Run 19 and Run 20). The redox potential (Eh) was measured in mV. The pH was <0.

Air was bubbled through the leach solution to strip hydrogen sulfide formed during the leach from the leach solution.

The leached solution was subjected to a liquid/solids separation step. The solids (washed) and liquid obtained were subjected to analysis for the content of nickel, iron, copper, gold, silver, platinum, palladium and rhodium. The extraction of each metal was then calculated.

The results obtained, expressed as percentages based on the analysis of the solids, are shown in Table VII, together with the weight loss of the anode slime after leaching. Table VII shows the redox potential, in mV, at the end of the leach. In Run 19 the oxidant was sodium hypochlorite at 120 L of 5.25 w/v % NaOCl per tonne of anode slime sample, and in Run 20 the oxidant was sodium chlorate added at 160 kg/tonne of ore.

TABLE VII

|  | Run 19 | Run 20 |
| --- | --- | --- |
| Redox potential (Eh) | 550 | >850 |
| Weight loss (%) | 18.8 | 18.8 |
| Ni extraction (%) | 86 | 107 |
| Fe extraction (%) | 117 | 132 |
| Cu extraction (%) | 92 | 104 |
| Au extraction (%) | n/a | 64 |
| Ag extraction (%) | n/a | >82 |
| Pt extraction (%) | n/a | 56 |
| Pd extraction (%) | n/a | 62 |
| Rh extraction (%) | n/a | 64 | n/a = not analyzed

The results show that value metals can be extracted from a secondary feed such as an anode slime material. The results also demonstrate that at higher redox levels, PGMs and gold may also be leached.

Example VIII

A sample of a copper sulfide/oxide ore containing 1.275 wt % copper, 2.61 wt % iron and 0.83 wt % sulfur was subjected to a leach using a leach solution of hydrochloric acid (4N) and magnesium chloride, at a total chloride ion concentration of 400 g/L, that additionally contained 20 kg/tonne of sodium chlorate. The leach was conducted for 4 hours at 95-105° C. The pH was <0. The ore was minus 150 mesh and was used at 5 wt % solids. The residue from the leach was analyzed for copper, iron and sulfur.

It was found that 97.3% of the copper, 69.4% of the iron and 54.6% of the sulfur in the ore had been leached, thereby demonstrating the leaching of a mixed sulfide/oxide ore of copper. The weight loss in leaching was 10.2% and the terminal redox potential was greater than 450 mV.

Example IX

The procedure of Example VIII was repeated, using the same ore, except that the leach was conducted on 10 wt % solids and the sodium chlorate was used in an amount of 10 kg/tonne. In addition, the resultant leach solution, not the residue was analyzed. In this test (Run 21), it was found that 96.5% of the copper and 88.8% of the iron had been leached into solution, thereby illustrating the invention. The weight loss in leaching was 17.8% and the terminal redox was 450 mV. The pH <0.

The procedure of Example VIII was repeated using the same ore, except that the oxidant used was 48 kg/tonne of hydrogen peroxide and the leach was conducted for 6.5 hours. Analysis of the leach solution showed that 92.4 wt % of the copper and 88.5 wt % of the iron had been leached into solution, thereby showing that hydrogen peroxide was less effective than sodium chlorate as oxidant. The weight loss in leaching was 11.8% and the terminal redox was greater than 450 mV. The pH was <0.

In a comparative test (Run 22), the procedure of Example VIII was repeated using the same ore but without addition of any oxidant. The leach time was increased from 4 hours to 12 hours. Analysis of the leach solution showed that 96.2 wt % of the copper and 82.1 wt % of the iron had been leached into solution, thereby showing that a substantially increased leach time was required in the absence of oxidant. The weight loss in leaching was 11.0% and the terminal redox was 420 mV. The pH was <0.

Example X

A sample of a polymetallic sulfide feed material containing 0.93 wt % copper, 44.9 wt % iron, 0.66 wt % nickel, 0.06 wt % cobalt, 23.9 wt % sulfur, 0.50 g/t platinum, 1.79 g/t palladium, 0.02 g/t rhodium, 0.03 g/t gold and 1.6 g/t silver was subjected to a leach using a leach solution of hydrochloric acid (4N) and magnesium chloride, at a total chloride ion concentration of 400 g/L, that additionally contained 20 kg/tonne of sodium chlorate. The leach was conducted for 4 hours at 100-105° C. The feed material was used at 5 wt % solids. The pregnant leach solution obtained from the leach was analyzed for copper, iron, nickel and cobalt. The pH was <0.

It was found that 97.1% of the copper, 98.1% of the iron, 93.2% of the nickel and 71.5% of the cobalt in the polymetallic sulfide feed material had been leached into solution, thereby demonstrating the leaching of a polymetallic sulfide material. The weight loss in leaching was 82.8% and the terminal redox potential was 480 mV. Only 0.1% Pt, 0.02% Pd, 2.6% Rh, 0.6% Au and 16.3% Ag were extracted in this controlled oxidation leach test.

The invention claimed is:

1. A process for leaching a value metal from an unroasted sulfide ore material containing said value metal, comprising the step of leaching the unroasted sulfide ore material at atmospheric pressure with a lixiviant consisting essentially of hydrochloric acid, magnesium chloride and an oxidant selected from the group consisting of alkali metal peroxide, alkali metal perchlorate, ammonium perchlorate, magnesium perchlorate, alkali metal chlorate, alkaline earth metal perchlorate, chlorine, alkali metal hypochlorite, hydrogen peroxide and peroxysulfuric acid, and mixtures thereof to obtain a leachate and a solid residue, wherein gold and platinum group metals in the sulfide ore material essentially remain in the solid state, said leaching step being carried out at a temperature of from 75° C. to the boiling point of the lixiviant at atmospheric pressure, said lixiviant having a redox potential in the range of 250 to 600 mV.

2. The process of claim 1 further comprising selecting a sulfide ore material that contains at least one value metal selected from the group consisting of nickel, copper, zinc, cobalt and mixtures thereof.

3. The process of claim 2 further comprising selecting a sulfide ore material that additionally contains at least one value metal selected from the group consisting of gold and a platinum group metal.

4. The process of claim 2 further comprising selecting a sulfide ore material from the group consisting of sulfide ore material that comprises a base metal sulfide ore, a concentrate of a base metal sulfide ore, a matte obtained from a base metal sulfide ore, tailings from the processing of a base metal sulfide ore and mixtures thereof.

5. The process of claim 4 further comprising selecting a sulfide ore material from the group consisting of pyrrhotite, pentlandite, chalcopyrite, pyrite, arsenopyrite and sphalerite, and mixtures thereof.

6. The process of claim 2 further comprising selecting an oxidant from the group consisting of chlorine, sodium chlorate, hydrogen peroxide, sodium hypochlorite and sodium perchlorate and mixtures thereof.

7. The process of claim 5 further comprising selecting an oxidant from the group consisting of sodium chlorate, chlorine and mixtures thereof.

8. The process of claim 2 further comprising adjusting the pH during the leach so that the pH is less than 2.5.

9. The process of claim 1 wherein the redox potential of the lixiviant is in the range 250-450 mV.

10. The process of claim 8 further comprising selecting the concentration of magnesium chloride to be at least 200 g/L.

11. The process of claim 10 further comprising selecting the total concentration of chloride ions to be in the range of 200-500 g/L.

12. The process of claim 11 further comprising selecting the total concentration of chloride ions to be in the range of 200-400 g/L.

13. The process of claim 11 further comprising adjusting the pH so that, at the end of the leach, the pH is less than 1.5.

14. The process of claim 12 further comprising adjusting the pH so that, at the end of the leach, the pH is less than 1.

15. The process of claim 3 in which the leachate and a solid residue is subjected to a solids/liquid separation step and the solid residue is subjected to a further leaching step to recover at least a portion of the gold and at least one of the platinum group metal.

16. The process of Claim 15 in which the solid residue is also treated for separation of a magnetic fraction.

17. The process of claim 1 further comprising selecting the ore or concentrate to comprise values of nickel and iron, and one or more of cobalt and copper.

18. The process of claim 1 further comprising:
   a) subjecting the leachate to a series of value metal recovery steps and obtaining a value metal depleted leachate and
   b) treating the value metal depleted leachate to recycle at least a portion of the magnesium chloride.

19. The process of claim 18 wherein step (b) comprises pyrohydrolysis.

20. The process of claim 19 wherein step (a) includes at least one precipitation step using a base.

21. The process of claim 20 further comprising selecting magnesium oxide as the base.

22. The process of claim 21 wherein step (b) includes producing magnesium oxide from the value metal depleted leachate.

* * * * *